United States Patent [19]
Bonvallet et al.

[11] Patent Number: 5,450,611
[45] Date of Patent: Sep. 12, 1995

[54] FAST CHANNEL ACCESS PROTOCOL FOR A TWO-WAY COMMUNICATION SYSTEM

[75] Inventors: Michael J. Bonvallet, Algonquin; Gary W. Grube, Palatine; Leslie G. Gustafson, Jr., Oakwood Hills; Michael D. Sasuta, Palatine, all of Ill.

[73] Assignee: Motorola, Inc., Schaumburg, Ill.

[21] Appl. No.: 753,016

[22] Filed: Aug. 23, 1991

Related U.S. Application Data

[63] Continuation of Ser. No. 651,052, Feb. 4, 1991, which is a continuation of Ser. No. 563,893, Aug. 6, 1990, which is a continuation of Ser. No. 174,733, Mar. 29, 1988.

[51] Int. Cl.⁶ .................................................. H04Q 7/28
[52] U.S. Cl. ............................. 455/34.1; 455/35.1; 455/54.2
[58] Field of Search ............... 455/34.1, 34.2, 35.1, 455/9, 11.1, 20, 54.1, 54.2, 56.1, 67.3, 102; 379/58, 63

[56] References Cited

U.S. PATENT DOCUMENTS

| | | | |
|---|---|---|---|
| 4,012,579 | 3/1977 | Lynk, Jr. et al. | 179/41 A |
| 4,259,663 | 3/1981 | Gable | 371/71 |
| 4,612,415 | 9/1986 | Zdunek et al. | 179/2 EB |
| 4,638,496 | 1/1987 | Jensen | 455/212 |
| 4,646,345 | 2/1987 | Zdunek et al. | 379/62 |
| 4,672,601 | 6/1987 | Ablay | 370/31 |
| 4,692,945 | 9/1987 | Zdunek | 455/17 |
| 4,701,944 | 10/1987 | Howard et al. | 379/63 |
| 4,716,407 | 12/1987 | Borras et al. | 340/825.04 |

FOREIGN PATENT DOCUMENTS 2165127  9/1984  United Kingdom.

*Primary Examiner*—Edward F. Urban
*Attorney, Agent, or Firm*—D. J. Stockley

[57] ABSTRACT

Requesting (transmitting) subscriber units may immediately begin transmitting an information signal over an assigned communication channel. Receiving subscriber units immediately unmute their speakers and monitor the assigned communication channel and attempt to detect a code, which indicates that they are monitoring the correct communication channel. At the central station (repeater), the information signal may be immediately repeated, unless an interference signal is present. In this way, the information signal may be rapidly disseminated (repeated) to improve subscriber access time, while providing assurance that the receiving subscribers will not receive a noise signal or the interference signal.

6 Claims, 6 Drawing Sheets

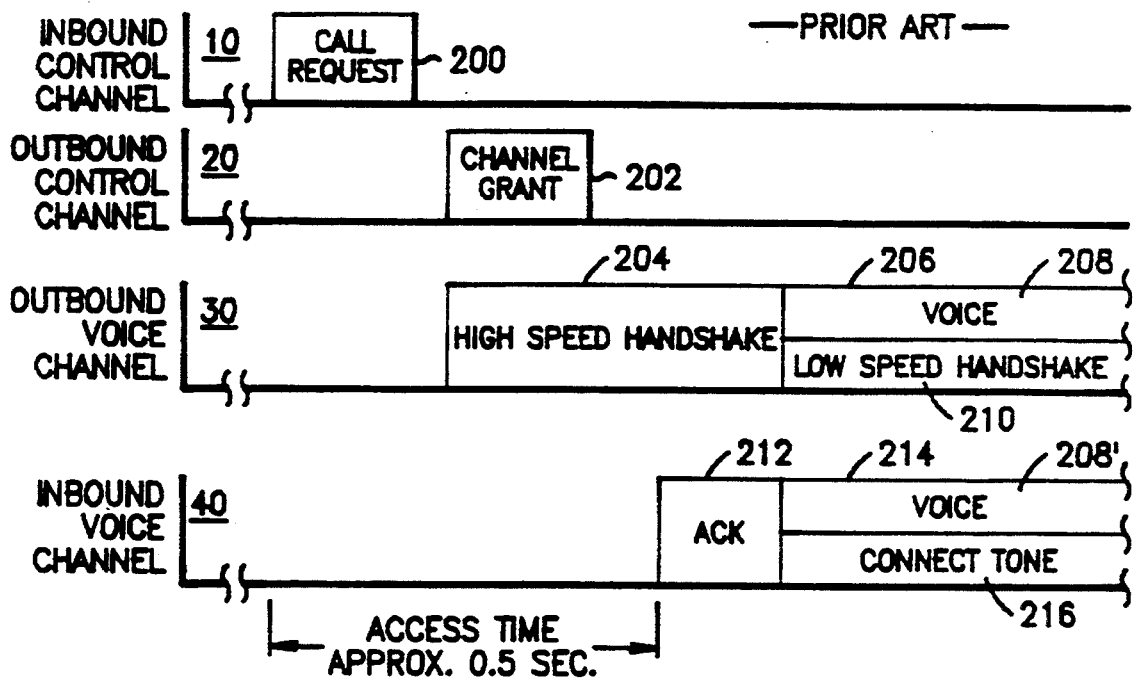
FIG.2 —PRIOR ART—
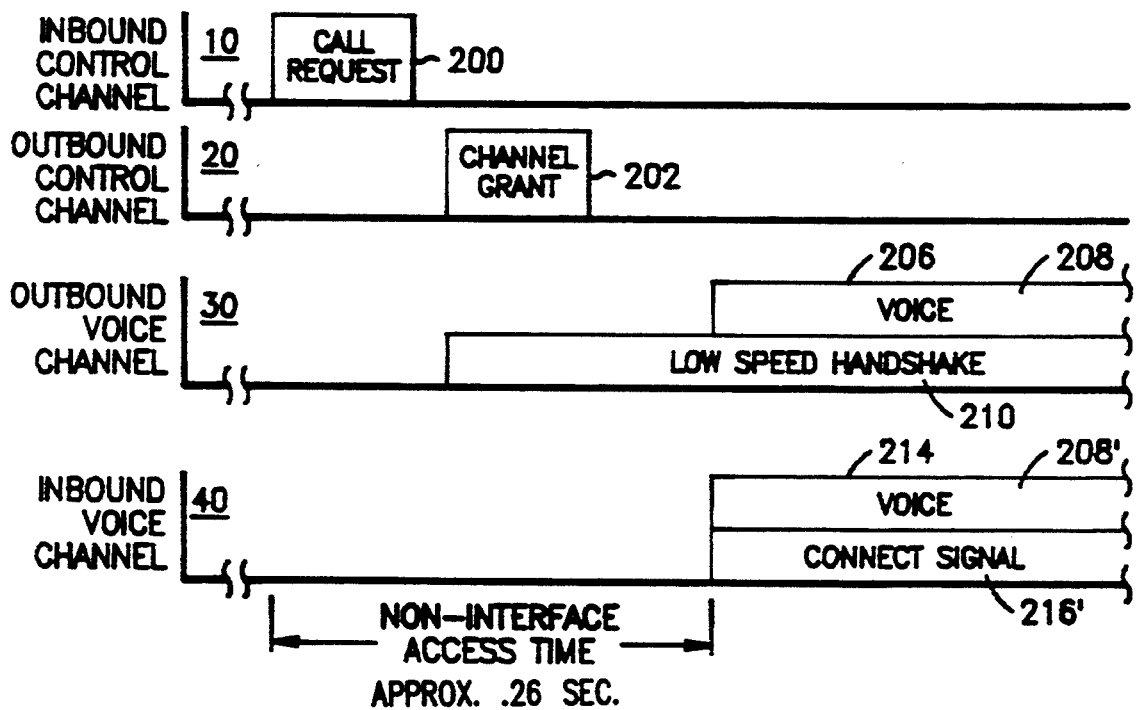
FIG.3

FAST CHANNEL ACCESS PROTOCOL FOR A TWO-WAY COMMUNICATION SYSTEM

This is a continuation of application Ser. Nos. 07/651,052; 07/563,893; 07/174,733, filed Feb. 4, 1991; Aug. 6, 1990; Mar. 29, 1988 and now abandoned.

TECHNICAL FIELD

This invention relates generally to signalling protocols for two-way communication systems, and more specifically to a fast channel access signalling protocol for a trunked communication system.

BACKGROUND ART

The goal of any trunked communication system is to allocate a limited number of communication channels among a plurality of subscriber units. To establish communication between subscribers, it is known for a requesting subscriber unit to transmit a call request code over a particular one of the communication channels reserved as a control channel. Upon receipt of the call request, the central returns a channel grant code (assuming that a channel is available for use), which instructs the requesting subscriber to move to a particular communication channel as a transmitting unit and instructs other subscribers to move to the communication channel as receiving units.

Generally, trunked communication channels comprise a pair of frequencies: an outbound frequency and an inbound frequency. The inbound frequency is typically understood to carry communications from the subscriber to the central station, while the outbound frequency carries communication from the central to the subscriber units. As used herein, subscriber units may be portable units, mobile units, or control stations. Generally, a portable unit is a transceiver design to be carried on or about the person, a mobile unit is a transceiver design to be installed in vehicles, and a control station is generally understood to be a permanent or semi-permanent installation in a building or other fixed site.

In trunked communication systems, access time is defined as the time interval between the time the requesting subscriber generates its call request, until the time the receiving subscriber units may receive a valid transmission on the assigned communication channel. Clearly, it is advantageous to make the access time of the trunked communication system as short as possible. One existing trunked communication system has an access time of approximately 0.5 seconds. While this has proved sufficient for the communication needs of several trunked system users, the public safety market has collectively published the so-called APCO-16B specification, which requires a trunked communication access time of less than 0.5 seconds. Therefore, while the existing access times may generally meet the APCO-16B specification, there is a need in the art to dramatically improve the access time of trunked communications systems for the public safety market.

SUMMARY OF THE INVENTION

Accordingly, it is an object of the present invention to provide an improved trunked communication system.

It is another object of the present invention to reduce the access time for subscriber units operating within a trunked communication system.

Briefly, according to the invention, a requesting subscriber unit may be assigned a communication channel and immediately begin transmitting an information signal. Receiving subscriber units immediately unmute their speakers, move to the assigned communication channel, and attempt to detect a code, which indicates that they are monitoring the correct communication channel. At the central station (repeater), the information signal may be immediately repeated, unless an interference signal is present. In this way, the information signal may be rapidly disseminated (repeated) to improve subscriber access time, while providing assurance that the receiving subscribers will not receive a noise signal or an interference signal at the beginning of a communication.

BRIEF DESCRIPTION OF THE DRAWINGS

The invention, may be understood by reference to the following description, taken in conjunction with the accompanying drawings, in which:

FIG. 2 is an illustration of the access protocol according to the prior art;

FIG. 3 is an illustration of the non-interference access protocol of the present invention;

DETAILED DESCRIPTION OF THE PREFERRED EMBODIMENT

Figure 1:
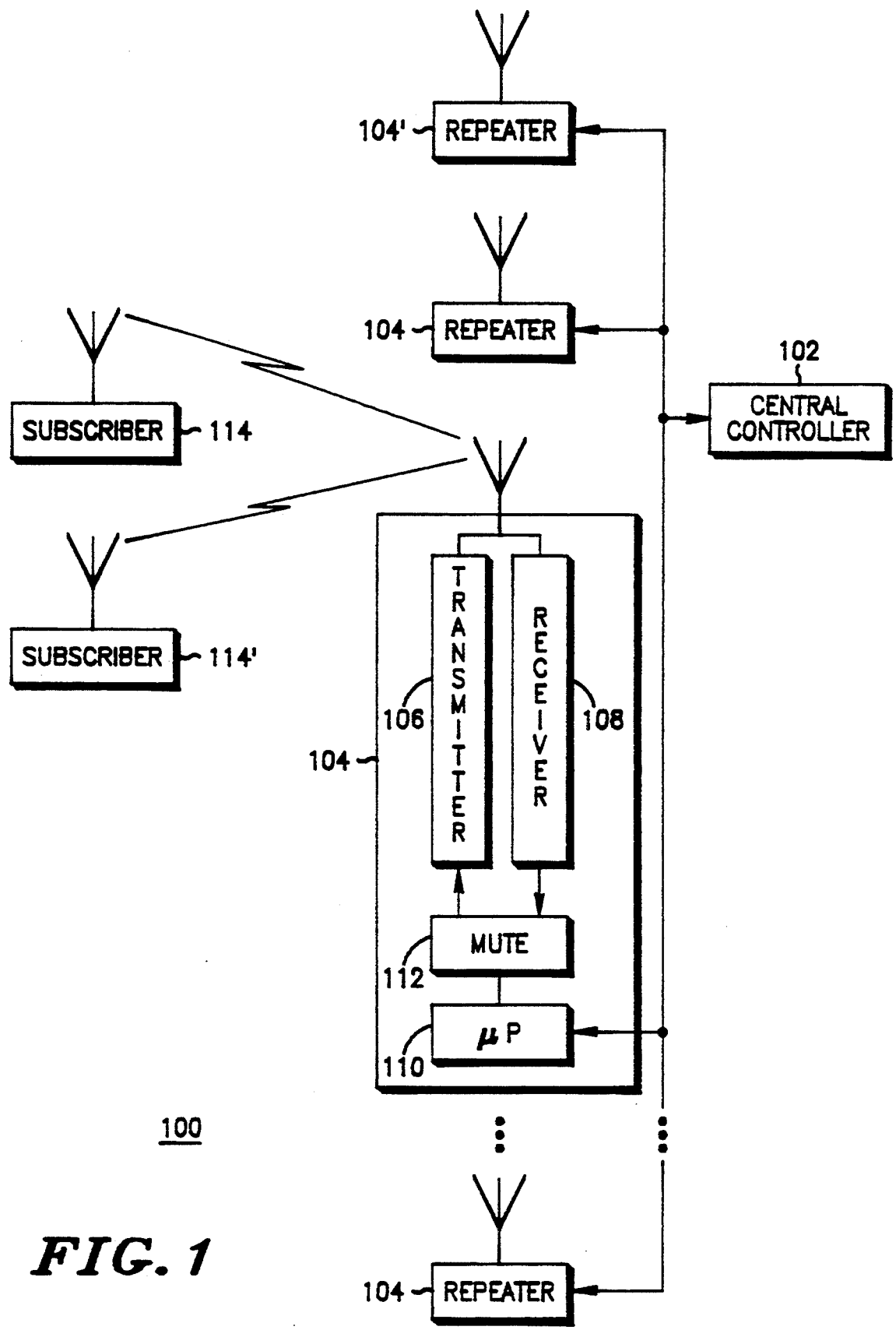
FIG. 1 is a block diagram for a trunked communication system employing the present invention.

Referring now to FIG. 1, there is shown a trunked communication system (100), which may incorporate the fast access protocol of the present invention. The trunked communication system (100) consists of a plurality of subscriber units (two shown 114 and 114') and fixed-end equipment consisting of a central controller (102), which is operably coupled to a plurality of trunked repeaters (104 and 104'). Generally, one of the trunked repeaters (104') is selected to operate as the control channel to receive call requests and transmit channel grants and other control and status codes. According to the present invention, each trunked repeater (104) consists of a receiver (108), which may route received audio to a transmitter (106) to be repeated to the subscriber units. Typically, the trunked repeaters (104) are controlled by a microprocessor (110) or other suitable control device, which determines whether the received (108) message should be transmitted (106) or muted (112).

Referring now to FIG. 2, the signalling protocol of the prior art is illustrated. To request a communication channel, a requesting subscriber unit may transmit a call request (200) on the inbound control channel (10). After processing the call request, the central (102) may return a channel grant code (202) via the outbound control channel (20). Simultaneously, the central (102) causes a high speed handshake code (204) to be generated through the assigned trunked repeater so that the receiving subscriber units moving to the outbound voice channel (30) may receive the highspeed handshake and prepare to receive an information signal. The channel grant (202) also causes the requesting subscriber unit to move to the voice channel as a transmitting unit on the inbound voice channel (40).

After receiving the highspeed handshake (204) for an appropriate amount of time, the transmitting (requesting) subscriber unit transmits an acknowledge code (212) prior to initiating its message (214), which consists of an information signal (for example a voice signal) (208') and a connect tone (216), which is used by the fixed-end equipment as a channel maintenance mechanism. That is, so long as the connect tone is received by a trunked repeater, the assigned communication channel (30 and 40) will be maintained so that communication may continue (even if the information signal (208) should momentarily stop).

At the conclusion of the acknowledge signal (212) and the highspeed handshake (204) the receiving subscriber units may receive the message (206) on the outbound voice channel (30). The message received by the receiving subscriber units include the repeated information message (208) and a lowspeed handshake (210), which preferably comprises a series of predetermined digital codes that are repeated subaudibly so as not to interfere with the information signal (208). As used herein, a subaudible message will be understood by those skilled in the art to mean a message that is transmitted in a band below the voice message band allowed by the particular trunked communication system irrespective of whether the frequency of the lowspeed handshake could be heard by the human ear. The lowspeed handshake (210) on the outbound voice channel (30) is also used as a channel maintenance measure in that the receiving subscriber units will remain on the outbound voice channel (30) so long as they are receiving the lowspeed handshake (210). At the conclusion of the call, the lowspeed handshake (210) ceases, which causes the subscriber units to automatically monitor the outbound control channel (20).

While the signalling protocol of FIG. 2 works well in most situations, the access time is approximately 0.5 seconds. To ensure that the access time is always compliant with the APCO-16B specification, it is the object of the present invention to improve upon the access time so as to facilitate communications between the subscriber units.

Referring now to FIG. 3, the fast access signalling protocol of the present invention is shown for the case when no interference signals are present. As discussed in FIG. 2, the protocol begins with a call request (200) transmitted on an inbound control channel (10) from a requesting subscriber unit. The fixed-end equipment of the trunked communication system may return the channel grant code (202) over the outbound control channel (20). According to the present invention, the highspeed handshake (204) of the prior art is omitted and the lowspeed handshake (210) begins commensurate with the transmission of the channel grant (202) on the outbound voice channel (30). Receiving subscriber units unmute their speakers immediately as they move to the assigned communication channel. Simultaneously, the receiving subscriber units monitor the outbound voice channel (30) and attempt to decode the lowspeed handshake (210). Failure to correctly detect the lowspeed handshake (210) within a predetermined time interval, will cause the receiving subscriber units to abandon the outbound voice channel (30) and monitor the outbound control channel (20). However, after correctly detecting the lowspeed handshake (210) the subscriber units remain on the outbound voice channel (30) and continue to receive the information signal (208).

The requesting (transmitting) subscriber unit moves to the voice channel (40) and immediately begins transmitting. The message (214) consists of an information signal (for example a voice signal) (208') and a connect signal (216'), which preferably comprises a tone or one or more digital codes that may be used for channel maintenance. As can be seen from comparisons of FIG. 2 and FIG. 3, the present invention affords an improvement in the trunked communication access time by providing a non-interference access time of approximately 0.26 seconds.

Figure 4:
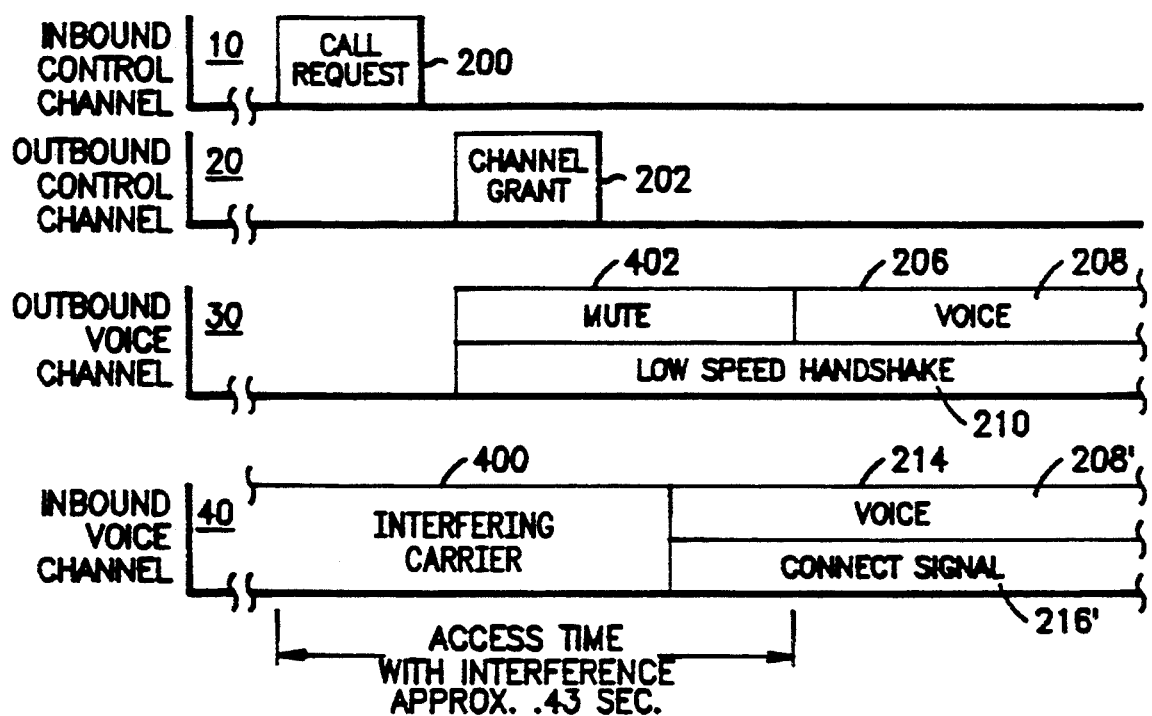
FIG. 4 is an illustration of the access protocol of the present invention when interference is present.

Referring now to FIG. 4, the fast access signalling protocol of the present invention faced with an interfering signal is shown. Similar to the above examples, the signalling protocol begins with a call request (200) transmitted by a requesting subscriber unit on an inbound control channel (10). The fixed-end equipment responds on the outbound control channel (20) with a channel grant code (202), which causes the requesting subscriber units to immediately unmute and monitor the outbound voice channel (30) and attempt to detect the lowspeed handshake (210) within a predetermined time interval. Failure to so detect the lowspeed handshake (210) will cause the subscriber unit to abandon the voice channel and monitor the control channel (20). However, the inbound voice channel (40) has present thereon an interfering signal (400). As used herein, an interfering signal is a radio frequency (RF) carrier originating from a source that is not part of the desired communication system. Of course, this interfering signal must be of a certain frequency and of sufficient level to cause significant interference with the communication system.

Upon detecting the interfering signal, the fixed-end equipment does not operate to immediately repeat the information signal (208'), but rather mutes (402) the repeated information signal (208) until the connect signal (216') is properly decoded (detected) to assure that the transmitting subscriber unit is transmitting a valid message (214). When the connect signal has been properly decoded, the repeated information signal (208) is transmitted on the outbound voice channel (30), which together with the lowspeed handshake (210) comprise the repeated message (206). In this way, the receiving subscriber units do not prematurely receive an interference signal or an undesirable noise burst. Thus, the present invention affords an improvement in access time by providing an access time of approximately 0.43 seconds, while ensuring that interfering signals do not undesirably disturb receiving subscriber units.

Figure 5A:
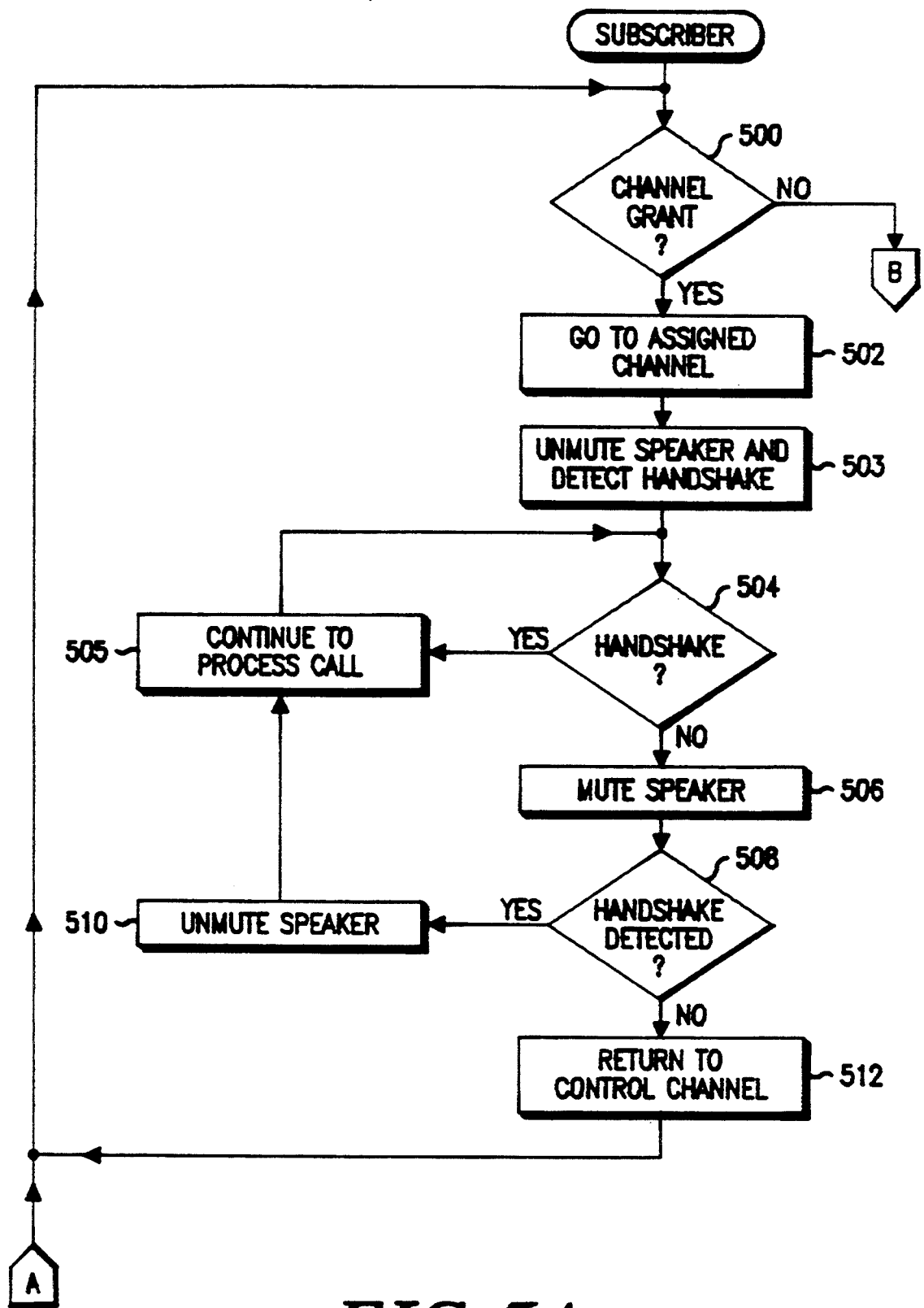
FIGS. 5a and 5b are flow diagrams illustrating the steps executed by a subscriber unit according to the present invention.
Figure 5B:
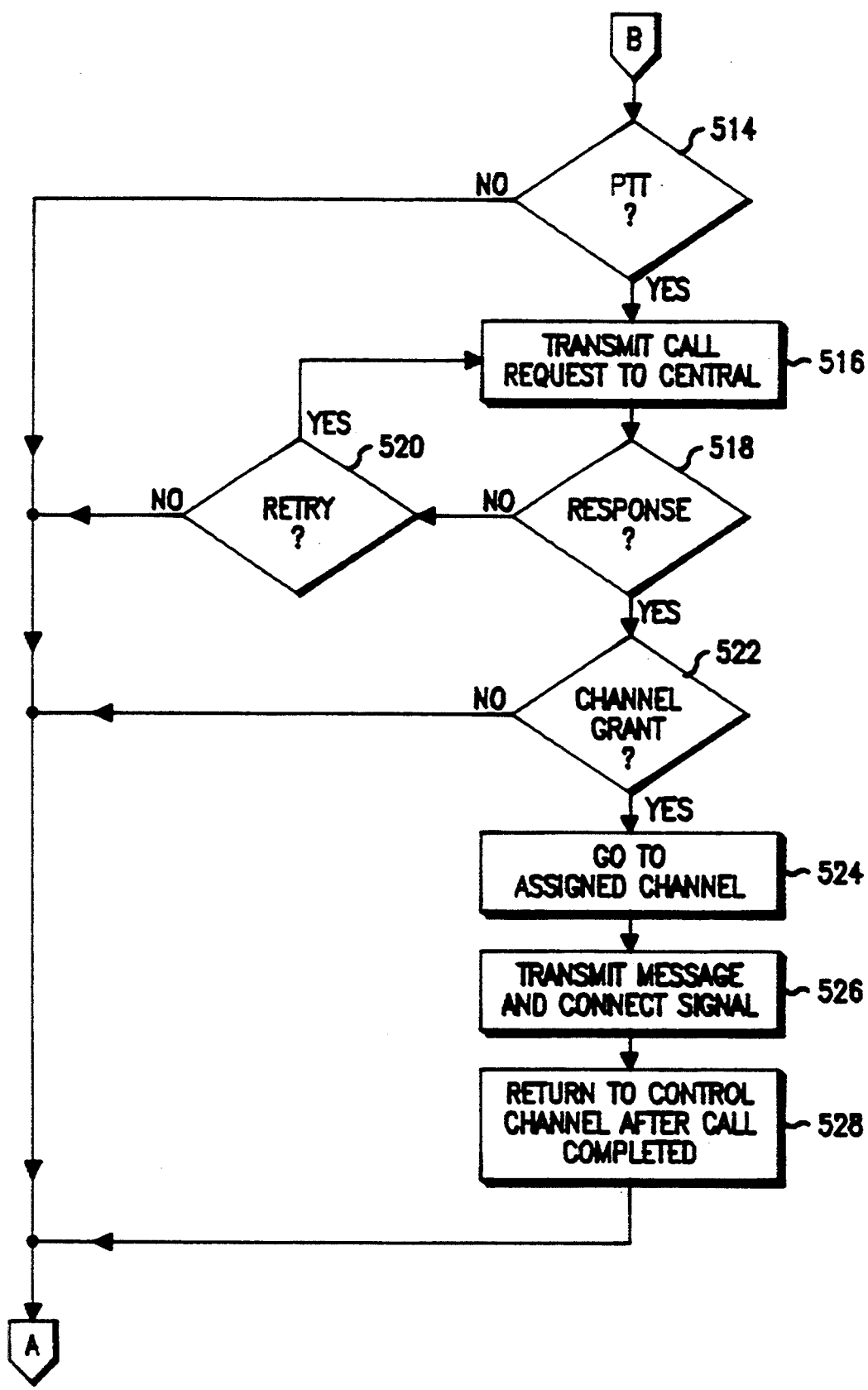

Referring now to FIGS. 5a and 5b, the steps executed by the subscriber units (114 and 114') of the present invention are illustrated. Decision 500 determines whether a channel grant code (202) has been received. If not, the routine proceeds to reference letter B of FIG. 5b. If, however, a channel grant code was received, the subscriber unit moves to the assigned voice channel (step 502), unmutes its speaker, and attempts to detect the lowspeed handshake (step 503). Decision 504 determines whether the subscriber unit has correctly detected the lowspeed handshake within a predetermined time interval. If so, the subscriber unit continues to process the call (step 505), while continuing to determine (decision 504) if the handshake was lost (i.e., became undetected after the initial detection). If the subscriber should lose the handshake during the call (or fail to initially detect it), the speaker is immediately muted (step 506). Following this, if the handshake is not quickly detected (decision 508), the subscriber unit returns to the control channel (step 512). If, however, the determination of decision 508 is that the lowspeed handshake was correctly re-detected, the speaker is again unmuted (step 510), and the routine proceeds to step 505 and decision 504 to continue to process the call.

Referring now to FIG. 5b, the subscriber unit routine continues in step 514, which determines whether the subscriber has activated the push-to-talk (PTT) switch to initiate a call. If not, the routine proceeds to reference letter A of FIG. 5a. Conversely, if the subscriber has activated the PTT switch, the routine proceeds to step 516, where the subscriber formats and transmits a call request code (200) to the central controller (102). Decision 518 determines whether a response has been received from the central. If not, the routine proceeds to decision 520, which determines whether the subscriber should retry (retransmit) the call request (step 516). According to the present invention, subscriber unit may retry a call request transmission a fixed number of times after waiting an appropriate time interval for a response from the central. Accordingly, if the determination of decision 520 is that the retry limit has been exceeded, the routine proceeds to reference letter A of FIG. 5a.

If the determination of decision 518 is that a response from the central has been received, the routine proceeds to decision 522, which determines whether a channel grant code (202) has been received. If not, the routine returns to reference letter A of FIG. 5a. Assuming, however, that a channel grant code was received, the routine proceeds to step 524, where the transmitting subscriber unit moves to the assigned channel and immediately begins transmitting the message consisting of the information signal and the connect signal (step 526). After completing the call, the subscriber unit leaves the assigned channel and returns to the control channel (step 528), after which the routine returns to reference letter A of FIG. 5a.

Figure 6:
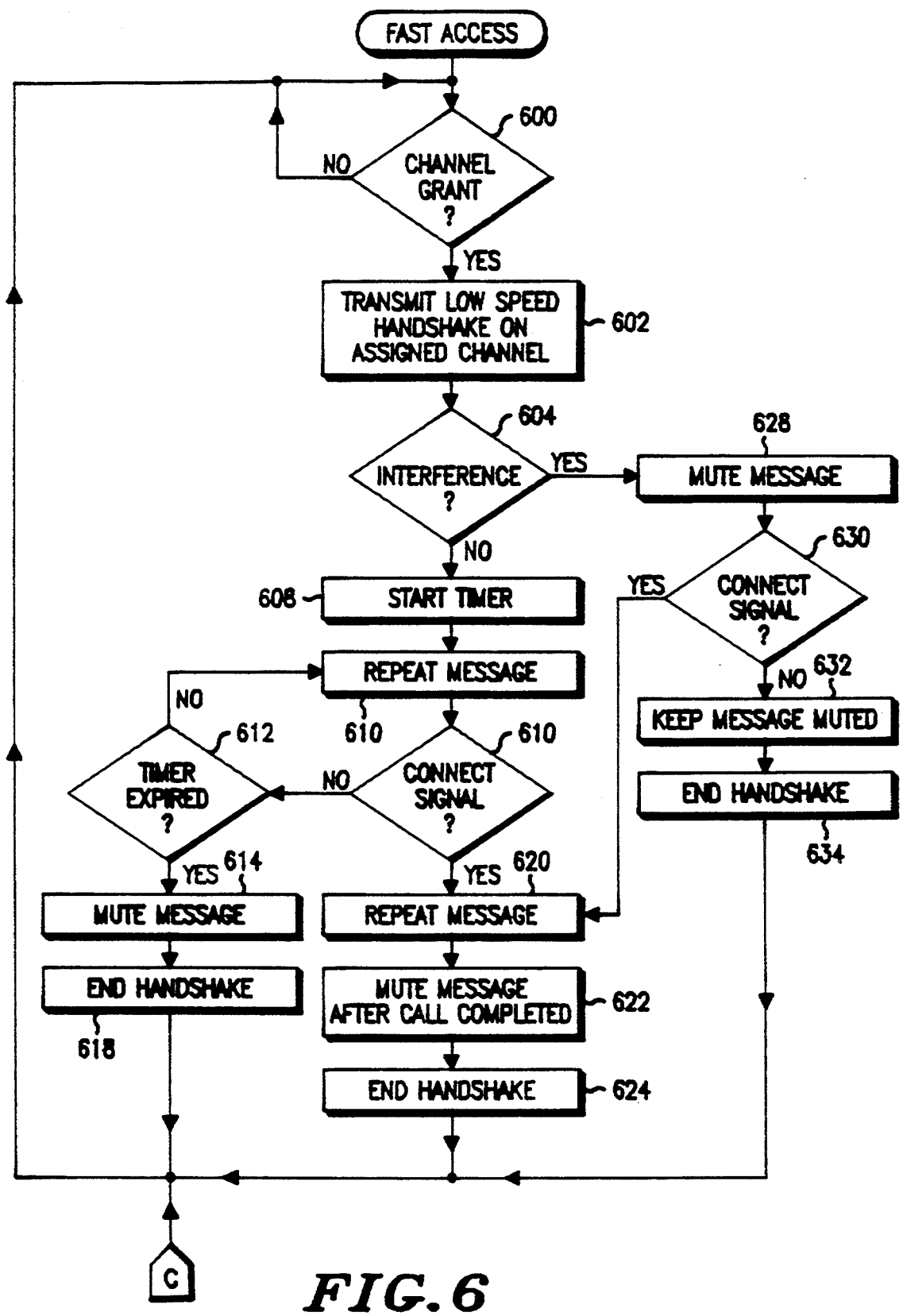
FIG. 6 is a flow diagram illustrating the steps executed at the fixed end (i.e., controller or repeaters) of the present invention.

Referring now to FIG. 6, the steps executed at the fixed-end equipment to implement the fast access protocol of the present invention is shown. Preferably, the fast access protocol of FIG. 6 is executed by the microprocessor unit (110) of the trunked repeaters (104). Alternatively, this routine could be executed by the central controller (102) and command signals could be communicated to the repeater (104) as to when to begin repeating (112) a received message. In any event, decision 600 determines whether a channel grant code has been authorized or transmitted by the central (102). If not, the routine proceeds to reference letter C. If, however, a channel grant code has been authorized, the assigned trunked repeater begins transmitting the lowspeed handshake on the assigned outbound voice channel (step 602).

Decision 604 determines whether an interference signal has been detected. If not, a timer is initialized (step 606) and the received message is immediately repeated (step 608) to the receiving subscriber units.

Decision 610 determines whether a valid connect signal (216') has been received from the requesting subscriber unit. If not, the routine proceeds to decision 612 to determine whether the timer has expired. If not, the message continues to be repeated (step 608), and the trunked repeater attempts to detect the connect signal (decision 610). If the connect signal is not detected before the timer expires, the routine proceeds to step 614, which mutes. (112) the message and ends the lowspeed handshake (step 618), which will cause all subscriber units to monitor the control channel. Following this, the routine returns to the reference letter C. If, however, the connect signal is detected before the end of the timer interval, the message continues to be repeated (step 620), after which the message is muted (step 622) and the lowspeed handshake ends (step 624). Of course, the fixed-end equipment provides for a momentary drop-out of the connect signal after initial detection to prevent unnecessary interruption or termination of a call.

Assuming now that the determination of decision 604 was that an interfering signal was present, step 628 operates to mute the receive message (112) until the connect signal is detected (decision 230). After a valid detection of a connect signal, the routine proceeds to step 620, which unmutes the message and allows the call to proceed normally (of course, the transmitter (106) continues to transmit an unmodulated carrier, which quiets the receiving subscriber units and prevents the operator from hearing noise). However, if a connect signal is not detected (decision 630), the message is kept muted (step 632), and the routine proceeds to step 634, which ends the lowspeed handshake to cause all subscribers to return to the control channel.

Accordingly, the present invention provides improved access time for subscriber units, while providing protection against interfering signals and noise in the receiving subscribers. In this way, system performance is enhanced and access time remains at all times compatible with the APCO-16B specification.

What is claimed is:

1. In a two-way communication system having a central unit for allocating a limited number of communication channels among a plurality of subscriber units, a communication method comprising the steps of:
   at least some of the plurality of subscriber units:
      (a) receiving a channel grant code;
      (b) unmuting and monitoring, substantially immediately, a channel identified by said channel grant code;
      (c) determining whether a transmit information signal has been received on said channel identified by said channel grant code within a time interval; and
      (d) continuing to remain unmuted and monitor said channel identified by said channel grant code if said transmit information signal has been received within said time interval;
   which communication method includes the central unit steps of:
      (e) transmitting said channel grant code;
      (f) transmitting, automatically, at least said transmit information signal upon said channel identified by said channel grant code;
      (g) determining whether an interference signal is present upon said channel identified by said channel grant code;
      (h) muting the transmit information signal to the at least some of the subscriber units when an interference signal has been detected prior to detecting a connect signal from the at least some of the subscriber units;
      (i) receiving a message comprising at least an information signal and the connect signal from said channel identified by said channel grant code;

(j) repeating at least a portion of said transmit information signal during a second time interval if said interference signal is not present; and (k) continuing to repeat said at least a portion of said transmit information signal if said connect signal is detected within said second time interval.

2. In a two-way communication system having a central unit for allocating a limited number of communication channels among a plurality of subscriber units, a communication method comprising the steps of:

at least some of the plurality of subscriber units:

(a) receiving a channel grant code;

(b) transmitting, substantially immediately, an information signal upon a channel identified by said channel grant code;

(c) unmuting and monitoring, said channel identified by said channel grant code after transmitting;

(d) determining whether a transmit information signal has been received from said channel identified by said channel grant code within a time interval; and (e) continuing to remain unmuted and monitor said channel identified by said channel grant code if said transmit information signal has been received within said time interval;

which communication method includes the central unit steps of:

(f) transmitting said channel grant code;

(g) transmitting, automatically, at least said transmit information signal upon said channel identified by said channel grant code;

(h) determining whether an interference signal is present upon said channel identified by said channel grant code;

(i) muting the transmit information signal to the at least some of the subscriber units when an interference signal has been detected prior to detecting a connect signal from the at least some of the subscriber units;

(j) receiving a message comprising at least said information signal and the connect signal from said channel identified by said channel grant code;

(k) repeating at least a portion of said transmit information signal during a second time interval if said interference signal is not present; and (l) continuing to repeat said at least a portion of said transmit information signal if said connect signal is detected within said second time interval.

3. In a two-way communication system having a central unit for allocating a limited number of communication channels among a plurality of subscriber units, a communication method comprising the steps of:

(a) transmitting a channel grant code to a particular subscriber unit;

(b) transmitting, automatically, a transmit information signal upon a channel identified by said channel grant code;

(c) determining whether an interference signal is present upon said channel identified by said channel grant code; p1 (d) muting the transmit information signal to the subscriber unit when an interference signal has been detected prior to detecting a connect signal from the subscriber unit; and (e) receiving a message comprising at least an information signal and the connect signal from said channel identified by said channel grant code and repeating, if said interference is present, at least said transmit information signal only after detecting said connect signal.

4. In a two-way communication system having a central unit for allocating a limited number of communication channels among a plurality of subscriber units, a communication method comprising the steps of:

at the central unit:

(a) transmitting a channel grant code to a particular subscriber unit;

(b) transmitting, automatically, a transmit information signal upon a channel identified by said channel grant code;

(c) determining whether an interference signal is present upon said channel identified by said channel grant code;

(d) muting the transmit information signal to the subscriber unit when an interference signal has been detected prior to detecting a connect signal from the subscriber unit;

(e) receiving a message comprising at least an information signal and the connect signal from said channel identified by said channel grant code;

(f) repeating at least said transmit information signal for a time interval if said interference signal is not present; and (g) continuing to repeat at least said transmit information signal if said connect signal is detected within said time interval.

5. In a two-way communication system having a central unit for allocating a limited number of communication channels among a plurality of subscriber units, a communication method comprising the steps of:

at least some of the plurality of subscriber units:

(a) receiving a channel grant code;

(b) transmitting, substantially immediately, an information signal upon a channel identified by said channel grant code;

(c) unmuting and monitoring, said channel identified by said channel grant code after transmitting;

(d) determining whether a subaudible signal has been received from said channel identified by said channel grant code within a time interval; and (e) continuing to remain unmuted and monitor said channel identified by said channel grant code if said subaudible signal has been received within said time interval;

which communication method includes the central unit steps of:

(f) transmitting said channel grant code;

(g) transmitting, automatically, a transmit information signal upon said channel identified by said channel grant code;

(h) determining whether an interference signal is present upon said channel identified by said channel grant code;

(i) muting the transmit information signal to the at least some of the subscriber units when an interference signal has been detected prior to detecting a connect signal from the at least some of the subscriber units;

(j) receiving a message comprising at least said information signal and the connect signal from said channel identified by said channel grant code;

(k) repeating, if said interference is not present, at least a portion of said transmit information signal during a second time interval; and (l) continuing to repeat said at least a portion of said transmit information signal if said connect signal is detected within said second time interval.

6. In a two-way communication system having a central unit for allocating a limited number of communication channels among a plurality of subscriber units, a communication method comprising the steps of:

(a) transmitting a channel grant code to a particular subscriber unit;

(b) transmitting, automatically, a subaudible signal upon a channel identified by said channel grant code;

(c) determining whether an interference signal is present upon said channel identified by said channel grant code;

(d) muting the transmit information signal to the subscriber unit when an interference signal has been detected prior to detecting a connect signal from the subscriber unit; and (e) receiving a message comprising at least an information signal and the connect signal from said channel identified by said channel grant code and repeating, if said interference signal is present, at least said transmit information signal only after detecting said connect signal.

* * * * *